United States Patent [19]

Zhang et al.

[11] Patent Number: 5,461,397
[45] Date of Patent: * Oct. 24, 1995

[54] DISPLAY DEVICE WITH A LIGHT SHUTTER FRONT END UNIT AND GAS DISCHARGE BACK END UNIT

[75] Inventors: Chao Zhang; Yu Feng; Shichao Ge, all of Santa Clara; Jemm Y. Liang, San Jose; Hsi-Sheng Chen, Milpitas, all of Calif.

[73] Assignee: PanoCorp Display Systems, Sunnyvale, Calif.

[*] Notice: The portion of the term of this patent subsequent to Feb. 7, 2012 has been disclaimed.

[21] Appl. No.: 133,561

[22] Filed: Oct. 7, 1993

Related U.S. Application Data

[63] Continuation-in-part of Ser. No. 52,772, Apr. 26, 1993, Pat. No. 5,387,921, and a continuation-in-part of Ser. No. 993,385, Feb. 18, 1992, abandoned.

[30] Foreign Application Priority Data

Oct. 8, 1992 [CN] China .................... 92111225.4

[51] Int. Cl.[6] .................... G09G 3/36; G09G 3/28; G09G 3/00
[52] U.S. Cl. .................... 345/102; 345/5; 345/66
[58] Field of Search .................... 345/4, 5, 62, 66, 345/102

[56] References Cited

U.S. PATENT DOCUMENTS

| | | |
|---|---|---|
| 3,783,184 | 1/1974 | Ernstoff et al. |
| 4,510,417 | 4/1985 | Harvey . |
| 4,872,741 | 10/1989 | Dakin et al. |
| 4,907,862 | 3/1990 | Suntola . |
| 4,945,281 | 7/1990 | Ipson . |
| 5,093,652 | 3/1992 | Bull et al. |
| 5,121,233 | 6/1992 | Spencer et al. |
| 5,128,782 | 7/1992 | Wood . |

FOREIGN PATENT DOCUMENTS

| | | |
|---|---|---|
| 60-216435 | 10/1985 | Japan . |
| WO9110223 | 7/1991 | WIPO . |
| WO9202947 | 2/1992 | WIPO . |

OTHER PUBLICATIONS

"Plasma Displays," by Larry F. Weber, Flat–Panel Displays and CRTs, ed. Lawrence E. Tannas, Jr., Van Nostrand Reinhold, pp. 332–415, New York 1985.
"Retroreflecting Sheet Polarizer," by M. F. Weber, SID 92 Digest, pp. 427–429.
"Gas Discharge Displays: A Critical Review," by R. N. Jackson and K. E. Johnson, Advances in Electronics and Electron Physics, 35:191–267.
"Development and Production of a Flat Fluorescent Lamp for LCD Backlighting," by Coleman et al., SID 92 DIGEST, pp. 430–432.

Primary Examiner—Jeffery Brier
Attorney, Agent, or Firm—Majestic, Parsons, Siebert & Hsue

[57] ABSTRACT

A display device containing an LCD light shutter front end to modulate light transmittance and a substantially flat gas discharge back end unit containing multiple gas discharge tunnels. The back end unit contains priming means to allow fast ignition of gas discharge and control means to allow independent discharge control of each discharge tunnel. The control circuit is further simplified to allow a small number of driving signals to control a large number of discharge tunnels. This backlight structure allows color light pulses to be generated in synchronization with the scanning operation of the front end unit. The combined operation of these two units can produce color images through time sequential color mixing principle. Compact and power efficient color display panels can be produced without the use of color filter in the LCD.

40 Claims, 8 Drawing Sheets

DISPLAY DEVICE WITH A LIGHT SHUTTER FRONT END UNIT AND GAS DISCHARGE BACK END UNIT

CROSS-REFERENCE TO RELATED APPLICATIONS

This application is a continuation-in-part patent application of U.S. patent application Ser. No. 052,772 filed Apr. 26, 1993 entitled "Scanning Back Illuminating Light Source for Liquid Crystal and Other Displays" now U.S. Pat. No. 5,387,921, and is a continuation-in-part of U.S. patent application Ser. No. 993,385 filed Dec. 18, 1992 entitled "Display Device" now abandoned.

This application claims priority based on an application filed Oct. 8, 1992 in the People's Republic of China, Serial No. 92111225.4, which together with the two applications above, are hereinafter referred to the "parent applications".

This application is related to the following patent applications: U.S. patent application Ser. No. 812,730 filed Dec. 23, 1991 entitled "Liquid Crystal Display with Color Back Light" now U.S. Pat. No. 5,402,143 and PCT Patent Application No. PCT/US92/10925 filed Dec. 18, 1992, hereinafter referred to the "related applications".

BACKGROUND OF THE INVENTION

This invention relates in general to a display device containing a light shutter front end unit to modulate light transmittance and a gas discharge back end unit supplying light of one or more colors to the front end unit.

As portable computers become more popular, flat panel display technology becomes more and more important. The most successful flat panel display technology today are the liquid crystal display (LCD) panels. In the current commercial color LCD display panels, color filters are used to filter white light into the three primary colors. In addition, in order to obtain the desired color mixing ratio, each of the monochrome pixel will need to be partitioned into three subpixels in order to modulate the transmittance of each of the three primary colors. In this approach, most of the light generated by the back end unit is lost in the color filter. The opening in the LCD panel which allows the light to pass through is also reduced since more area is occupied by signal paths and various devices necessary to control the three subpixels. Multiplying these two factors together, color filtered LCD panels become quite power inefficient. Generally, high power consumption and high price, both caused by the complexity introduced by the color filter and the significantly increased pixel density, are considered as the two most serious drawbacks of current color LCD products.

Figure 2:
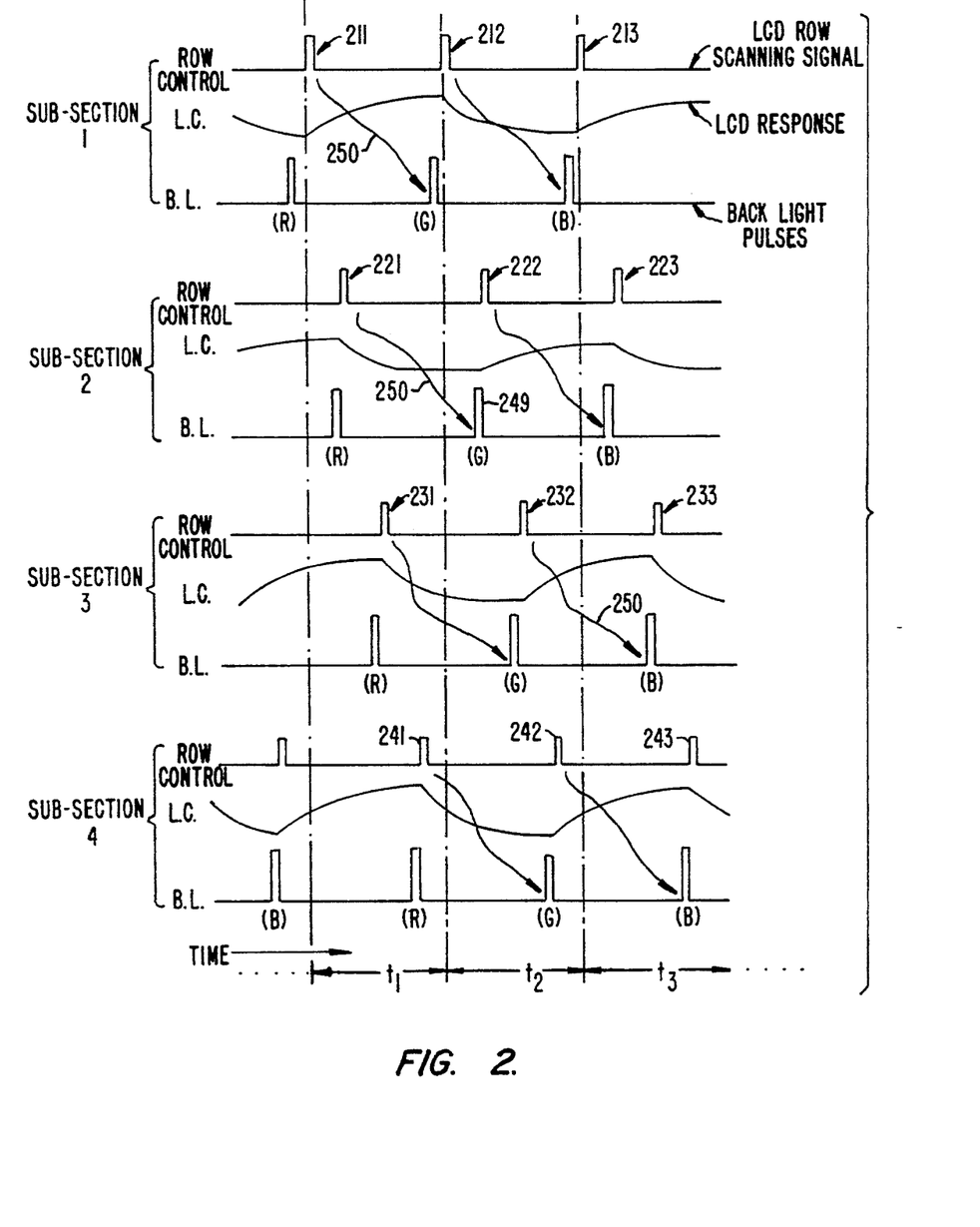
FIG. 2 is a timing diagram illustrating the operation of the front end unit and the back end unit of FIGS. 1A, 1B.

In the above-referenced PCT patent application Ser. No. PCT/US92/10925, filed Dec. 18, 1992, an alternative method for generating color images with LCD is proposed. In this approach, a new backlight structure called electronic fluorescent backlight (EFBL) is used to produce color light pulses of the three primary colors. When these color light pulses are generated in synchronization with the LCD scanning operation, in a manner similar to that described below as indicated in FIG. 2, and when such color light pulses pass through the LCD pixels when the illuminated pixel has substantially finished the transition, good quality color image is produced. Since the EFBL can generate highly saturated red, green and blue primary colors, there is no need for color filtering. The LCD only needs to modulate the transmittance of the three color pulses to produce the desired color mixing. This approach allows the light generated by the backlight unit to pass through the LCD without being filtered. This approach not only avoids the complexity and cost of color filter and the associated subpixels, but also vastly improves the light transmittance of the LCD at the same time.

The EFBL in the related applications are cathode luminescence devices. Due to the light emission principle of these devices, an anode voltage of 5 KV or higher is frequently desirable or necessary in order to produce light at sufficiently high efficiency levels. Due to insulation and other electrical reliability considerations, this high anode voltage puts constraint both on the thickness of the device and on the size of the anode power supply. As portable computers become more and more compact, this size restriction may become a serious deficiency. Moreover, the high anode voltage can easily become a safety hazard in the compact packaging of a portable system. The handling of this high voltage would require extra effort of the system designer and may potentially increase the cost of the system. It is thus desirable to provide an improved display device where the above described difficulties are overcome.

SUMMARY OF THE INVENTION

One aspect of the invention is directed towards a display apparatus comprising a front end unit and a back end unit. The front end unit includes a body having arrays of areas that are light modulating defining arrays of pixels for light transmission and a front end control device controlling intensity of light transmission through the pixels for displaying images. The back end unit includes a housing having at least one array of gas discharge channels substantially parallel to the arrays of pixels, wherein gas discharges in said channels cause said channels to emit light, and includes priming means populating at least some of the channels with charged particles before gas discharge occurs in said at least some of the channels. The back end unit further includes a back end control device controlling gas discharge in said channels so that gas discharge occurs in each of said at least some channels after it is populated therein with charged particles. The back end control device also controls gas discharge in said channels so that selected channels of said at least some channels emit light sequentially to supply light to the front end unit for displaying images.

Preferably the back end unit contains multiple gas discharge channels or tunnels and priming means to allow fast ignition of gas discharge and control means to allow independent discharge control of each discharge channel or tunnel. In the preferred embodiment, the light shutter employs liquid crystal display (LCD) type material, and the control circuit is further simplified to allow a small number of driving signals to control a large number of discharge tunnels. This preferred backlight structure allows color light pulses to be generated in synchronization with the scanning operation of the front end unit. The combined operation of these two units can produce color images through time sequential color mixing principle. Compact and power efficient color display panels can be produced without the use of color filter in the LCD.

Another aspect of the invention is directed towards a display method employing a device comprising a front end unit and a back end unit. The front end unit includes a body having arrays of areas that are light modulating defining arrays of pixels for light transmission. The back end unit includes a housing having at least one array of gas discharge channels substantially parallel to the arrays of pixels. Gas discharges in the channels cause the channels to emit light. The method comprises modulating the intensity of light transmission through the pixels for displaying images. The method further comprises populating at least some of the channels with charged particles before gas discharge occurs in said at least some of the channels and causing gas discharge in said channels so that gas discharge occurs in each of said at least some channels after it is populated therein with charged particles, and so that selected channels of said at least some channels emit light sequentially to supply light to the front end unit for displaying images.

DESCRIPTION OF THE PREFERRED EMBODIMENT

The current invention is based on the recognition of an alternative implementation of the backlight unit which can be used in place of the EFBL of the parent applications, particularly where multicolor or full color image display is desired. This new structure requires significantly lower operating voltage while providing improvement in terms of power efficiency and structural simplicity. The structure in the current invention called scanning fluorescent backlight or SFBL utilizes gas discharge principle to generate UV light which in turn excites phosphor materials to convert UV into a single color or one or more of the three primary color light.

The gas discharge principle has been used in many common light sources, such as the fluorescent lamps used in office lighting and the backlight used in the current LCD panels. These devices utilize the positive column (the plasma section) of gas discharge phenomenon to generate light. The light generation efficiency of these devices can be more than 60 Lumen per Watt (L/W) or almost eight times higher than what can be achieved by EFBL. However, these devices are slow and switching ON and OFF of these devices can be quite complicated. In order to operate in the manner as outlined in FIG. 2, and where backlight pulses are generated with cycle time of around 5 mS with pulse width of around 1 mS, the backlight unit will need to be able to ignite the gas discharge promptly and reliably. This is very difficult to be achieved with the traditional fluorescent lamps.

In the operation described in FIG. 2, each color image is subdivided into three subframes, one for each of the three primary colors. For each of these subframes, transmittance modulation data is sequentially scanned into the LCD pixels in a row-by-row fashion. At a fixed delay after the scanning of certain pixel rows, the light pulse of appropriate color is generated by means of the backlight unit to illuminate the corresponding portion of LCD. The backlight pulses are preferably generated in a section-by-section scanning manner, and the backlight unit preferably has many parallel discharge channels or tunnels which can be independently controllable; in the context of the backlight or back end unit herein the term "channel" and the term "tunnel" are used interchangeably.

Another point of the operation is that the discharge tunnels are scanned in sequence, typically from one side of the backlight unit to the other side of the unit. Therefore, one aspect of the SFBL structures described herein is a preferably substantially flat light pulse generation device containing in the preferred embodiment multiple parallel discharge tunnels where at least some of these tunnels are mutually connected and can be independently controlled to produce light pulses in a section-by-section scanning manner.

Gas discharge is an avalanching ionization process where one charged particle collides with another neutral particle and, through ionization process, produces more than one charged particle in the end. According to the physics of the gas discharge phenomenon, the formation (or ignition) of a discharge will require the existence of certain quantity of initial charged particle. These charged particles will then be accelerated by an electric field induced through the voltage applied to two discharge electrodes. When the energy gained by these charged particles exceeds the ionization energy level of the gas mixture in the discharge chamber, the charged particles start to have non-elastic collisions with the neutral gas atoms. Such collision can ionize the atom and produce one positive ion and one free electron. As the process continues, the majority of the gas molecules will be ionized and the gas becomes plasma.

In conventional fluorescent lamps, the initial charged particles are either produced by externally heated cathode such as in hot cathode fluorescent lamp (HCFL), or by the ionization through radioactive means such as cosmic rays, such as cold cathode fluorescent lamp (CCFL). In either case, the ignition is far from prompt or reliable, taking anywhere from tens of milliseconds to a few seconds or longer. Although it is possible to solve this ignition problem in the case of HCFL by constantly heating the cathode, this approach will significantly reduce the efficiency and the life span of the lamp. In the case of CCFL, since the cathode is cold, typically this problem is minimized by using very high ignition voltage, which has many obviously undesirable side effects and is very difficult to handle. In order to solve these problems, another aspect of the present inventive SFBL structures is the provision of means for priming the channels or tunnels to be discharged with charged particles. This priming is to be performed before or immediately before the ignition voltage is applied to the discharge electrodes before the charged particles resulting from the priming have recombined or otherwise dissipated. By introducing a proper amount of priming charged particles, the ignition can be easily started without excessive ignition voltage and the operation can be reliably repeated.

Two types of priming methods are introduced in the preferred embodiments of the SFBL. One type of priming involves the propagation of charged particles between adjacent tunnels. By having some connections between neighboring chambers, the charged particles in the currently discharging chamber or chambers can propagate into neighboring chambers through diffusion action. If proper ignition voltages are applied to the discharge electrodes in one of these primed chambers before those charged particles recombine to form neutral particles, the discharge can be reliably and promptly ignited. Another type of priming is to share part of the discharge tunnel between subsequent discharges. By properly arranging the discharge electrodes, a subsequent discharge path can share portion of the discharge tunnels currently undergoing gas discharge. If the time lag between two subsequent discharges is short enough, the portion of shared tunnel will contain very high density of charged particles and therefore allow the discharged to be ignited easily.

Another aspect of this invention is the simplification of the control circuit of the gas discharge backlighting device. As will be evident from FIG. 2, in order to reduce the crosstalk between subsequent color fields in a multicolor or full color display, it is desirable to have a sufficiently large number of R/G/B color backlight elements. Normally, up to fifteen or more R/G/B groups can be used. To control so many gas discharge tunnels with individual drivers will be quite costly. As described below, by connecting the electrodes in certain channels or tunnels together into groups of connected electrodes and applying multiple phase mode driving signals to these groups, the control circuit for the back end unit can be simplified.

In the trend to make device more and more compact, it is inevitable that the display panel will need to reduce the thickness. In order to obtain proper color mixing between the three primary colors generated by the backlight, a diffuser 154 in FIG. 1B is used to combine these color lights. Since the diffuser requires a certain distance away from the light source to work properly, it is also desirable to increase the pitch of the discharge tunnels so that proper color mixing can be done in a very short distance. In order to increase the pitch of discharge tunnels, it will be necessary to reduce the cross-section of these tunnels. However, the reduction of cross-sectional dimensions will increase the rate of charged particle recombination along the surface of the wall. In order to replenish these lost charged particles, higher driving voltage will be required to accelerate the ionization process. This higher driving voltage is not acceptable in some applications so another aspect of this invention is the structure where each discharge tunnels are separated into more than one discharge path by introducing multiple set of driving electrodes in a single discharge tunnel. By dividing one discharge path into multiple smaller ones, the driving voltage can be reduced. In addition, according to the theory commonly known as the Panchen's law, the product of gas pressure and distance between discharge electrodes should be kept close to a constant. So dividing a long discharge tunnel into multiple smaller ones allows the pressure of the filled gas to be increased. The increased gas pressure will not only reduce the sputtering of the cathode due to the reduced speed of positive ions, but also increase the density of charged particles in the plasma which allows higher current to flow through the discharge tunnels and, therefore, increase the pulse brightness of the backlight unit.

Based on all of the observations made above, one of the most important aspects of this invention is the combination of a very efficient backlight generating device SFBL, a front end light transmittance modulator such as LCD and the color sequential operation method such as described in FIG. 2. The combination of these three elements allows very high efficiency flat panel device to be produced economically in a very compact format. For example, a well-engineered LCD panel with transmittance of 30–35% and a good SFBL with efficiency of 20–40 L/W should produce a display system with an overall efficiency of 7–10 L/W and a total thickness of 5–6 mm. This capability of the invention is in drastic contrast against what can be achieved by two of the component technologies alone. By LCD alone, as has been discussed above, the efficiency, cost and the manufacturability of the system all suffer greatly due to the need for color filter and subpixels. The best commercially available color LCD panels normally have power efficiency of around 0.8 L/W (ten times lower) and total panel thickness is around 10–12 mm (twice as thick). As for gas discharge, plasma display panel or PDP has been a strong candidate technology for flat panel display devices for more than fifteen years. However, in order to make two-dimensional matrix addressable display panels, each of the element discharge cells of the two-dimensional matrix in a typical PDP device has to be made very small. This restriction has forced PDP devices to operate in the much less efficient negative glow (avalanching) region of the gas discharge. As opposed to gas discharge lamps and SFBL, which all utilize the high efficiency positive column (plasma) region, unless the resolution is sacrificed to make discharge cells bigger, PDP devices generally have efficiency of around 0.2–0.7 L/W or about 10–20 times lower than what can be achieved by the combination of SFBL, LCD and color sequential operation.

Figure 1A:
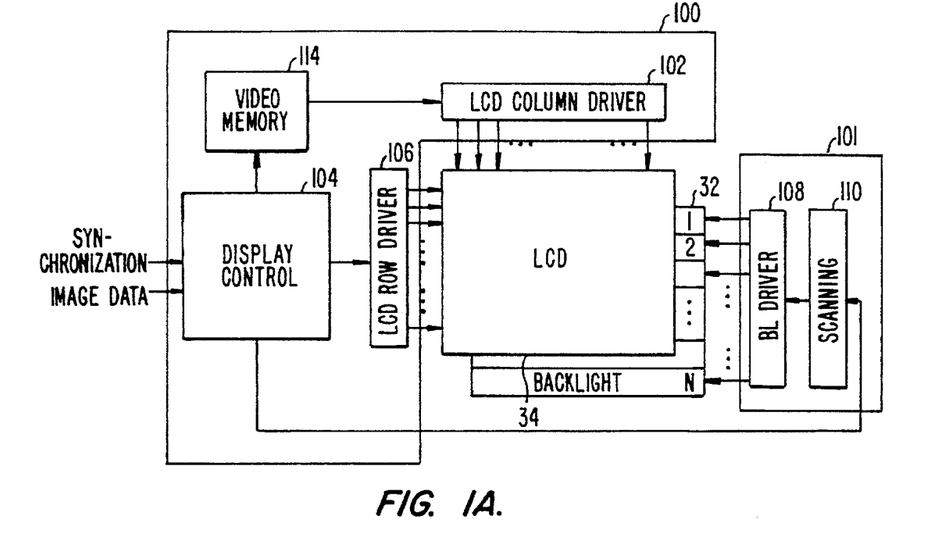
FIG. 1A is a block diagram of a visual display system including a LCD front end unit, a backlight unit, and control devices for controlling the two units to illustrate the invention.
Figure 1B:
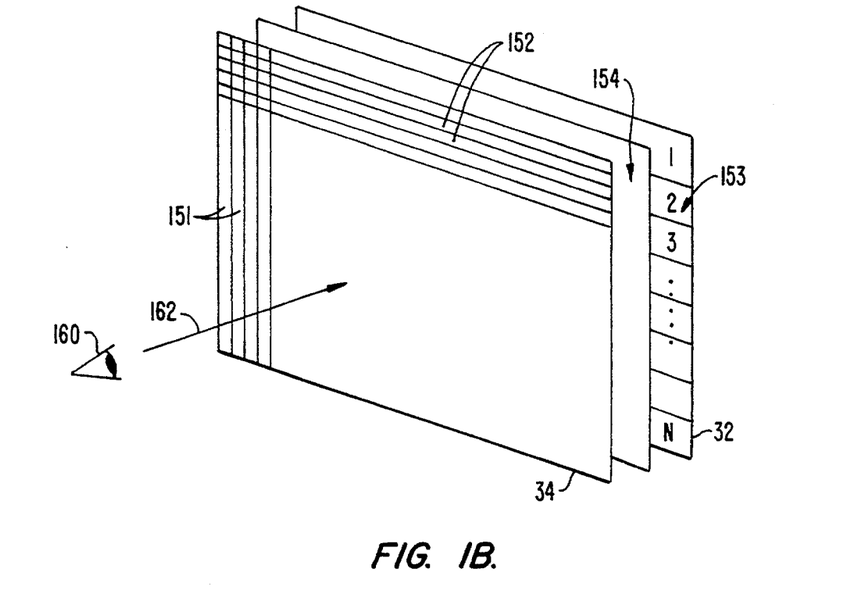
FIG. 1B is a schematic view of the front and back end unit as observed by an observer to illustrate the invention.

Referring to FIGS. 1A, 1B and 2, the display system in the preferred embodiment contains a display controller 104 controlling the overall operation of the display, a row driver 106 for scanning the LCD row-by-row, a column driver 102 for feeding the transmittance modulation signal to pixels of the row currently being scanned, a video memory 114 for storing the video image data for each of the three color subframes, a backlight unit 32 containing N (positive integer) subsections of independently controllable color light pulse generation elements, a LCD front end unit 34, a backlight scanning controller 110 for providing necessary driving signal to control the backlight 32, and a backlight driver 108 for providing necessary voltage and current control to produce the gas discharge and the light pulses. These control units are further grouped into a front end control unit 100, containing 104, 114, 102, 106, and a back end control unit 101, containing 108, 110.

During normal operation, the image data is transmitted to the display control unit 104. This image is then separated into three color subframes and stored in the video memory 114. The display control 104 reads the data from video memory 114 one line at a time to load the LCD column driver 102. When a full line of transmittance modulation data is loaded into driver 102, row driver 106 activates appropriate row signals to control the transmittance of the pixels of the selected row, and driver 102 feeds transmittance modulation data to the pixels of the selected row. The above scanning operation is repeated in a row-by-row manner through all rows of the LCD screen for each of the three color subframes. The cycle time for each full color frame would preferably be faster than 16.67 mS. Since each full color frame is made of three color subframes, the cycle time for each of the subframe is preferably faster than about 5.5 mS. As shown in FIG. 2, each of the LCD scanning cycle time intervals t1, t2, t3 is preferably 5.5 mS or less for each of the subframes, so that the total frame cycle time is 16.67 mS or less.

FIG. 1B is a schematic diagram of the front end unit 34 and back end unit 32 of FIG. 1A illustrating the spatial relationship between the arrays of pixels in unit 34 relative to the channels or tunnels of unit 32. As shown in FIG. 1B, front end unit has row electrodes 152 and column electrodes 151. To an observer 160, the rows of pixels will overlap the columns at a layer of light modulating material (not shown) between the row and column electrodes to define rows and columns of pixels that are substantially co-existensive with the overlapping areas of the row and column electrodes when viewed in a viewing direction 162. When the appropriate electrical potentials are applied across the layer of material using the row and column electrodes, the light transmittance through the areas of intersection between such row and column electrodes or pixels will be modulated.

The channels or tunnels of unit 32 are substantially parallel to rows 152 of pixels, where the channels are grouped into N independent subsections. Each tunnel or channel will overlap at least one corresponding row of pixels in the unit 34 when viewed along direction 162 so that light emitted by a channel will supply light to its corresponding rows of pixels. Each of the N subsections can produce one or more of red, green or blue color (or white) light pulses used to supply light to the front end unit 34 for displaying images. While the channels of unit 32 and the subsections are shown as parallel to the rows 152, it will be obvious that they may instead be parallel to the columns 151 or other linear pixel arrays; all such and other variations are within the scope of the invention.

In reference to FIG. 2, t1, t2, t3 are three representative time intervals or scanning cycles for the first pixel row located at the top of the LCD, corresponding to the first subsection. It will be noted that for the next pixel row just below the first row, the beginnings of the time intervals will be marked by the scanning pulses for such row and will be slightly time delayed relative to t1, t2, t3 and so on. Thus, for example, the onset time of pulse 221 marks the beginning of a scanning cycle for the first or top pixel row corresponding to the second subsection. During each scanning time interval, driver 106 applies scanning control signals once to each of the row electrodes 152 in the LCD front end unit, said scanning control signals being applied one by one sequentially. With respect to any one of the subsections, three time intervals such as t1, t2, t3 are required for supplying light of all three colors to the front end unit. In FIG. 2, the scanning pulses 211, 221, 231, 241 are only four representative pulses of the pulses supplied to the row electrodes in the front end unit during t1. Similarly, pulses 212, 222, 232, 242 are four representative pulses for scanning the rows pixels 152 during t2 and so on.

The pulse generation timing is synchronized with the row scanning signal of the LCD front end to optimize the performance of the display. If one logically divides the front end LCD into N subsections (N=4 in FIG. 2), each containing one or more rows corresponding to the subsection in the backlight unit, then preferably the row scanning signal timing and the backlight generation timing will have a relationship as illustrated in FIG. 2. For simplicity, FIG. 2 illustrates a case where the backlight or back end unit 32 has only four subsections. The pulses 211(G), 212(B), and 213(R) represent the row scanning signals for the top pixel row corresponding to the first subsection of backlight for displaying red, blue and green images respectively. Similarly, the pulses 221, 222 and 223 represent the row scanning signals for a pixel row corresponding to the second subsection of backlight and so on. Note that the light pulses for each color are generated at or near the end of each scanning cycle for that particular color, in that particular subsection. Thus pulse 221 is applied to modulate the light transmittance of the first pixel row in subsection two of unit 34 for displaying a green image thereat. But the green light pulse 249 directed to such row for displaying such green image is not generated by the corresponding channel in the second subsection of unit 32 until much later at or near the end of the scanning cycle for the pixel row or rows corresponding to the second subsection, and only slightly before the next pulse 222 is applied. In general the arrows 250 indicate the timing relationship between the scanning pulse for a row of pixels in the front end unit 34 for displaying an image of a particular color and the generation of light of such color by the corresponding channel in the back end unit where such light is not generated until the light transmittance of the row of pixels in the front end unit has settled.

To summarize the above, rather than generating each color light pulses simultaneously for all subsections, the light pulses from a particular subsection are delayed relative to the timing of the row scanning signals for the pixel rows corresponding to such subsection. By doing so, the LCD pixels are allowed to have the maximum amount of time to settle before the light pulses are shined through them. This operation scheme minimizes the error in the state of the transmittance of the pixels. In practical cases, in order to minimize the color crosstalk between subsequent color subframes and between neighboring subsections, the number of subsections may be much larger than four. Another reason for favoring a large number of subsections is to reduce the gap between color lighting elements. For a constant screen size, the number of subsections increases when the gaps between lighting elements are reduced. These smaller gaps are requirements for diffusers to work effectively within compact packaging. Diffusers, such as diffuser 154 in FIG. 1B, are usually inserted between the LCDs and the backlights to produce smooth lighting for LCDs.

Figure 3A:
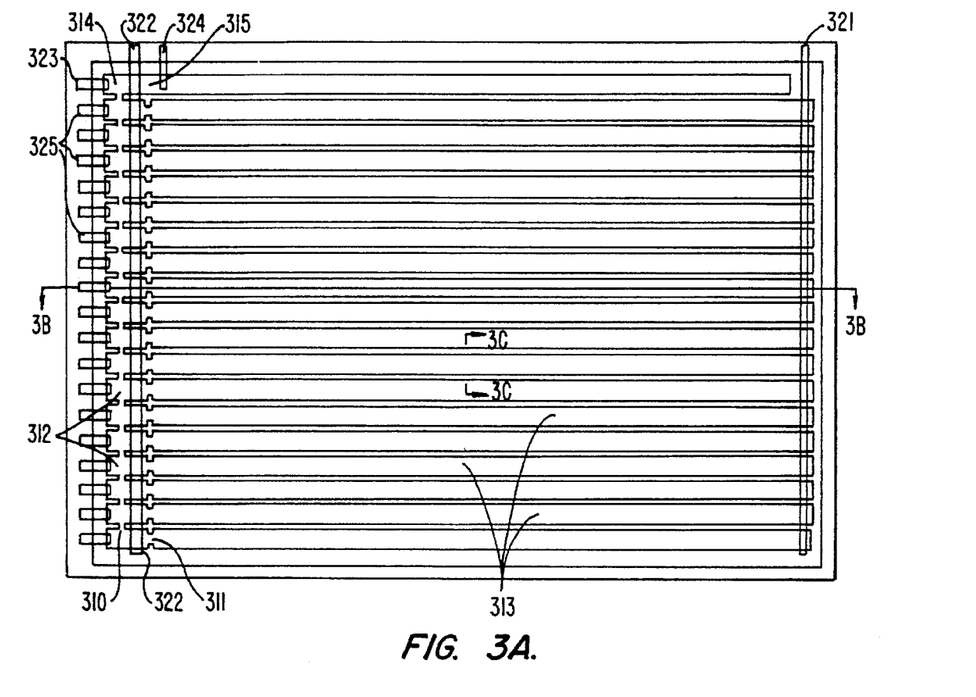
FIG. 3A is a top view of a backlight source illustrating a first embodiment of the backlight unit of FIGS. 1A, 1B.
Figure 3B:
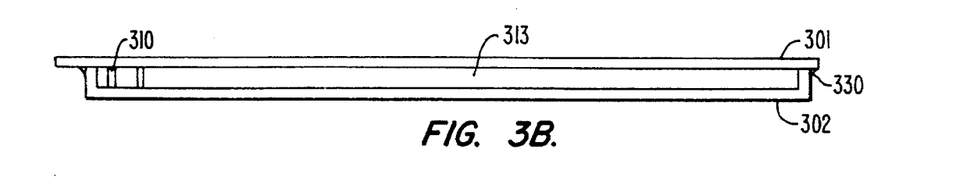
FIG. 3B is a cross-sectional view of the backlight unit of FIG. 3A along the line 3B—3B in FIG. 3A.
Figure 3C:
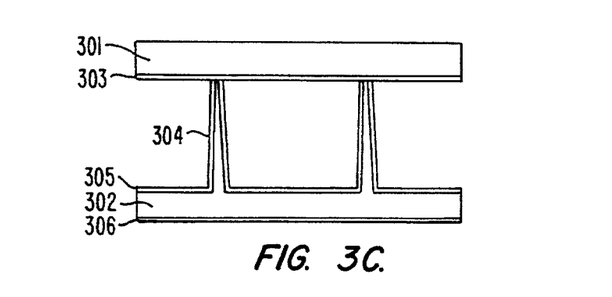
FIG. 3C is a cross-sectional view of the backlight unit of FIG. 3A along the line 3C—3C in FIG. 3A.
Figure 6A:
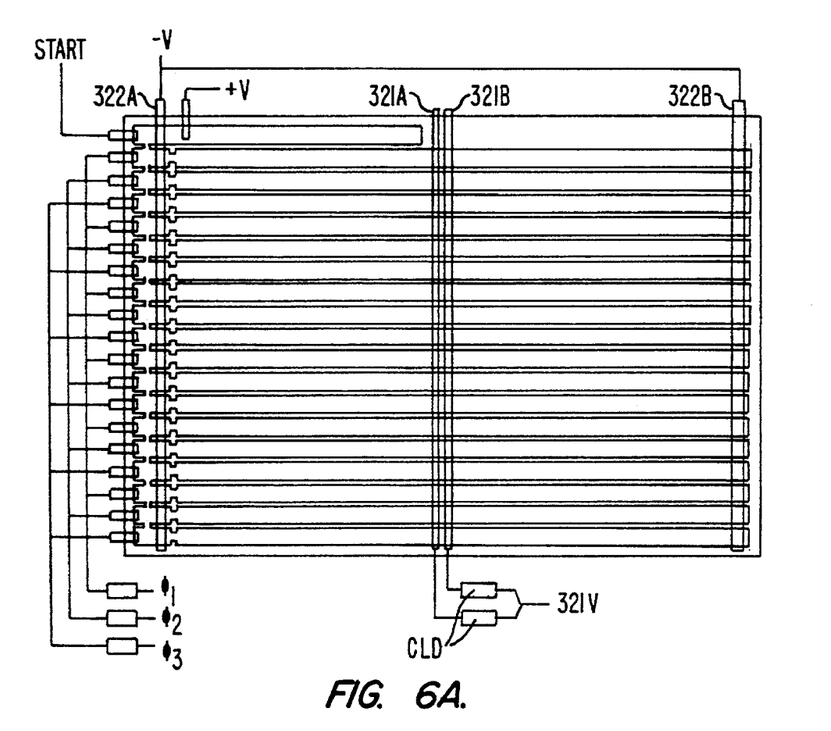
FIG. 6A is a top view of a light source illustrating a fourth embodiment of the backlight unit of FIGS. 1A, 1B.

Referring to FIGS. 3 and 6, a preferred embodiment of the backlight unit 32 is illustrated. The embodiment includes two plates 301 and 302. FIG. 3A is a top view drawn in a see-through manner since plate 301 is transparent. FIG. 3B is a cross-sectional view along line 3B—3B in FIG. 3A. FIG. 3C is a cross-sectional detail view along line 3C—3C in FIG. 3A.

Plate 301 is positioned between plate 302 and the LCD and is substantially transparent to the visible lights. Plate 301 may further contain a coating 303 in its surface facing plate 302. Preferably, coating 303 should be made UV reflective so that the UV produced by the gas discharge can be reflected back to the discharge tunnel and excite the phosphors. Coating 303 can also be made UV absorptive so that the UV generated by the gas discharge would not escape the backlight unit and interfere with the operation of the LCD panel. Plate 302 may be made of molded glass/ceramic or photo etched glass such as Fotoform glass from Corning. Although in FIG. 3C, plate 302 is shown as having narrow sharp ridges, it should be understood that other shapes of tunnel cross-section such as polygon, trapezoids and curves, are possible and are within the scope of this invention.

In FIG. 3C, plate 302 contains narrow ridges which form discharge tunnels when plate 301 is placed attached to plate 302 as illustrated in FIG. 3B. The formed tunnels containing holes 310 connecting adjacent tunnels together. Each tunnel comprises two portions or segments 312 and 313. Segment 313 is a main or primary discharge portion of a tunnel and is the primary source of light; portion 313 is the main and long discharge path between cathode 322 and anode 321. Portion 312, on the other hand, houses a short auxiliary pilot discharge path between pilot discharge electrodes 325 and cathode 322. The function of portion 312 is to facilitate scanning of the main or primary portions 313 of discharge tunnels by providing through holes 311 sufficient charged particles for priming such that portions 313 can be easily and promptly ignited. For this reason, portion 312 serves as a pilot to ignite gas discharge in the main portion and can be referred to as the pilot portion. The scanning of portions 312 is made possible by holes 310. These holes allow the charged particles to diffuse from a currently discharging portion 312 to the one or two neighboring or adjacent portions and to properly prime the adjacent portions 312 for the subsequent gas discharge. The scanning signal or signals, however, are applied to the array of pilot portions to cause this array to discharge sequentially from one end of the backlight unit to the other (e.g. from top to bottom). Note that of the main portions 313, only the one in communication with a portion 312 with highest density of charged particles, and to which adequate discharge potential difference is applied will experience gas discharge. While portions 312, 313 are shielded from one another except through hole 311, such shielding is to reduce the effect of sputtering of the cathode.

Electrodes 321 through 325 can be produced by either thin film coating or thick film printing of plate 301. Preferably, electrode 321 is the anode and electrode 322 is the cathode. Cathode surface condition is very important in cold cathode discharge operation. The electrode can be produced by first depositing an aluminum trace of suitable thickness on plate 301. On top of the aluminum trace, a very thin layer of magnesium is to be deposited. The combined structure can then be baked in an oxiding environment. The result will be a surface containing MgO and Mg with low work function on the surface. Electrodes 325 are discharge anode electrodes for auxiliary pilot discharge cells 312. These electrodes will produce gas discharge with electrodes 322 to generate charged particles for the main discharge portions 313. Electrode 324 is the anode for a keep alive cell 315. This keep alive cell will be constantly on and is the source of priming charged particles for the pilot portions 312.

The walls of main or primary discharge portions 313 are coated with phosphor material 304. This phosphor coating 304 will convert the UV lights generated by gas discharge into visible lights of red, green and blue colors. Preferably, coating 305 should have a very high reflective index for visible lights. This will help project the light generated by the phosphor toward the LCD. It is also desirable for coating 305 to reflect the UV back to the phosphor to enhance the efficiency and the brightness. Alternatively, coating 305 can absorb the UV so the phosphor coated on the next tunnel will not be excited by mistake. It may also be desirable to have a composite 305 coating such that it includes a partial UV reflector as inner coating and a strong UV absorber as the outermost coating. Optional coating 306 can be made of material such as aluminum. Coating 306 can help to improve the efficiency by reflecting back projecting lights toward the front. It also serves as a ground conductor layer to shield off electrical interferences and protects user from potential electrical shocks.

The primary purpose for pilot portions 312 is to allow the scanning of the device and to provide priming particles for the primary discharge portions 313. Preferably, the wall of portions 312 will not be coated with phosphor material so that its scanning will not interfere with the light pulse generation of portions 313. The detailed cross-section composition of portions 312 will be similar to portions 313 in FIG. 3C except for the phosphor coating 304.

In assembling the device, after plates 301 and 302 are properly prepared and precisely aligned, the two plates are sealed together with frit glass 330. The device is then baked and evacuated with a good vacuum pump and then filled with proper gas mixture, such as (Ne+0.2–0.8% Xe).

Figure 4A:
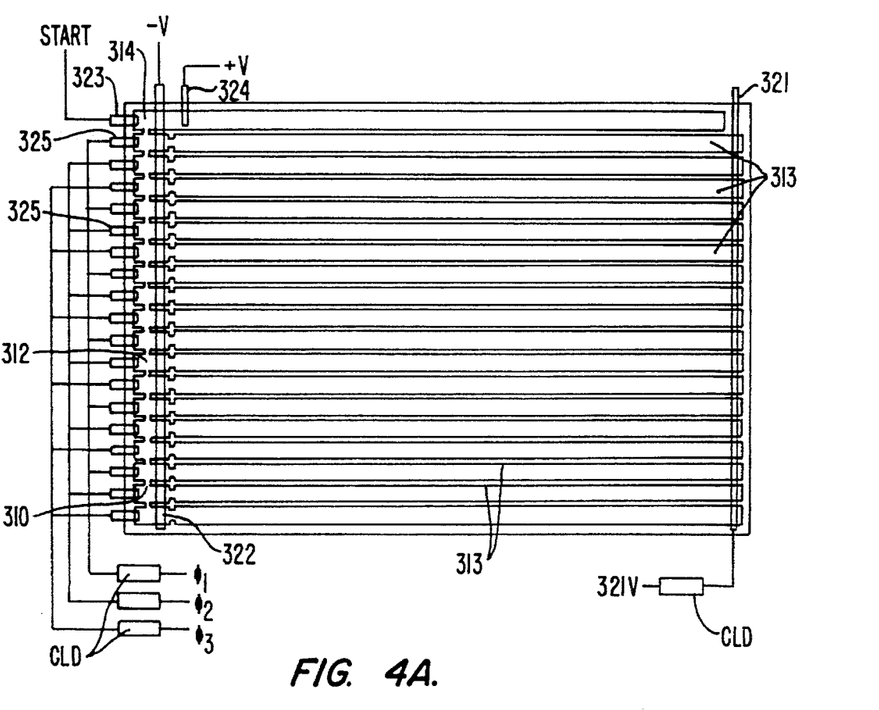
FIG. 4A is a top view of a backlight unit illustrating a second embodiment of the backlight unit of FIGS. 1A, 1B.
Figure 4B:
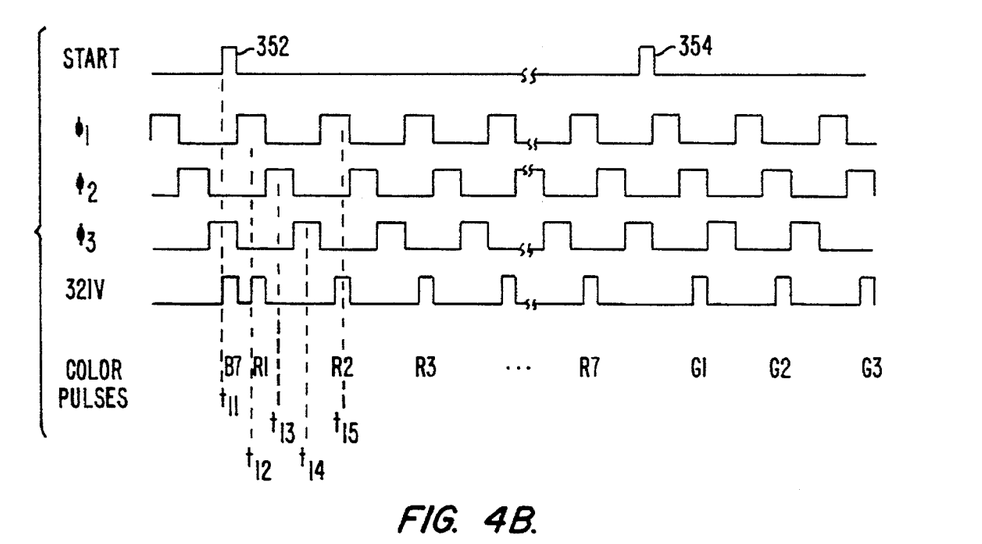
FIG. 4B is a timing diagram illustrating the operation of the backlight unit of FIG. 4A.

FIG. 4A illustrates the electrical connections and the driving waveforms for this embodiment. Depending on the geometrical design, the cathode material, the gas mixture, and the surface condition of the discharge tunnels, discharge ignition voltage may vary from around 200–300V. The cathode 322 is connected to a fixed negative voltage of around 150–250V. The driving waveform for the other electrode is shown in FIG. 4B. Electrodes 325 are grouped into three groups and are driven in a three phase self-scanning mode. The principle of the self-scan operation is vicinity propagation. By having holes 310 between neighboring portions 312, charged particles can diffuse into neighboring portions. Consider at a particular moment a certain portion 312 is fired and is filled with charged particles; both of its neighboring portions 312 will become properly primed. In the three phase connection, the ignition voltage is applied to one and only one of the two adjacent portions. After a short discharge formation time, of the two adjacent portions, the discharge will then "propagate" from the previous discharge pilot portion only to the pilot portion to which ignition voltage is applied for igniting gas discharge therein by three phase drivers in a manner shown in FIG. 4B. During the next time interval or cycle, the discharge will "propagate" yet to the next pilot portion sequentially down the array of pilot portions as controlled by the three phase waveform and so on. Theoretically speaking, in a properly designed device, a self scan scheme with three phase drivers or other multiple (e.g. greater than 3) phase drivers can control basically any number of discharge tunnels and therefore represent a significant saving in the cost of the device.

After the discharge is propagated to the proper portion 312, the voltage of anode 321 is raised to the ignition voltage. Although 321 is shared by all primary discharge tunnels 313, the one tunnel 313 connected to the auxiliary pilot discharge tunnel currently discharging or most recently discharged will have a much higher initial current than other tunnels 313. Since the discharge current growth rate is proportional to the initial current, this portion 313 will reach the full discharge state earlier than the other tunnels 313. The current limiting device CLD, normally a resistor or a capacitor, is used to reduce the applied voltage through anode 321 such that, once a tunnel 313 is fully ignited, no other tunnel can ignite any more. CLD helps to ensure that one of the primary discharge tunnels 313 is properly selected and ignited.

Electrode 323, although maybe physically identical to electrodes 325, is used as a special START electrode to control the initial priming between keep alive cell 315 and pilot portions 312. As shown in FIG. 4B, by putting an active voltage on the electrode 323, the discharge tunnel 314 is ignited with the help of priming particles from keep alive cell 315. In the next time slot, using proper three phase control signals, the discharge is transferred to the tunnels 312.

Thus to start back end unit 32, a positive START voltage pulse 352 is applied to electrode 323 at time t11 as shown in FIG. 4B. This will cause gas discharge in chamber 314 to generate priming charged particles therein. These particles propagate through hole 310 to the neighboring portion 312. Soon thereafter at time t12, phi-1 is pulled high so that the main portion 313 of channel in communication with the portion 312 having charged particles therein originating from chamber 314 will experience gas discharge, resulting in such channel generating red light pulse R1. Even though the next two neighboring portions 312 will receive priming particles and also experience pilot discharges therein at times t13, t14, no light pulses will be generated since there is insufficient voltage applied to the main portions in communication with such pilot portions in view of the three phase self-scanning waveform in FIG. 4B. As described above, gas discharge will propagate down the array of pilot portions 312, reaching the fourth pilot portion, for example. There is, however, sufficient voltage applied to the main portion in communication with the fourth pilot portion downstream from chamber 314 at time t15 in view of the three phase waveform, so that such main portion will experience gas discharge, resulting in light pulse R2 and so on. After all of the portions 312 have experienced discharges, another START pulse 354 will be needed to again repeat the above described process.

As shown in FIG. 4A, preferably, the holes 310 lie on a zigzag shaped line preferably perpendicular to the channels. It will be understood that the holes 310 may lie on a line of another shape, where the line is transverse to the channels; such and other variations are within the scope of the invention.

Figure 5A:
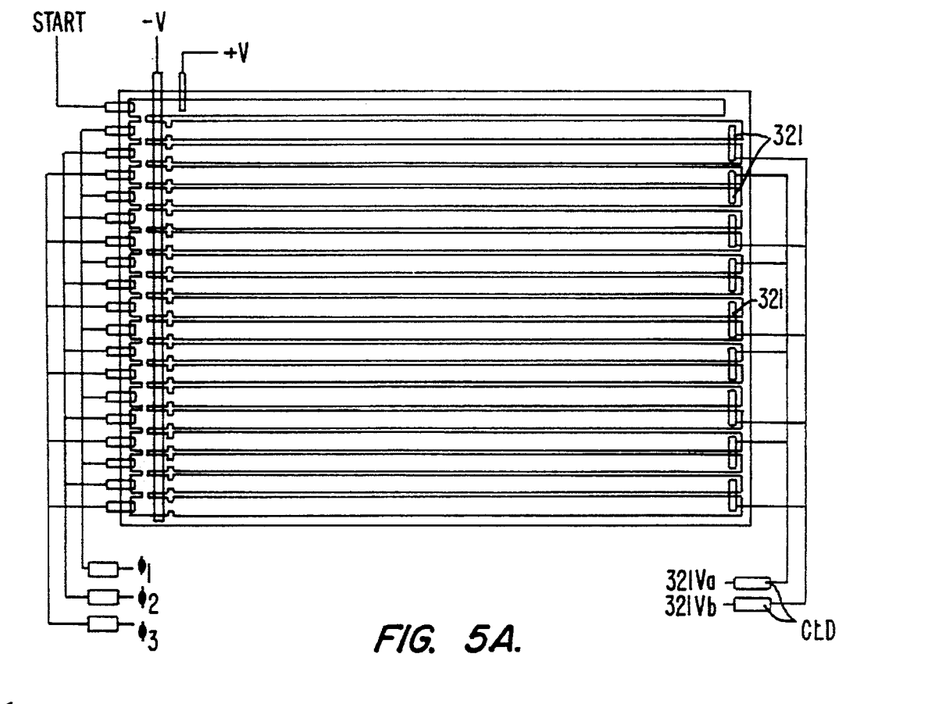
FIG. 5A is a top view of a light source illustrating a third embodiment of the backlight unit of FIGS. 1A, 1B.
Figure 5B:
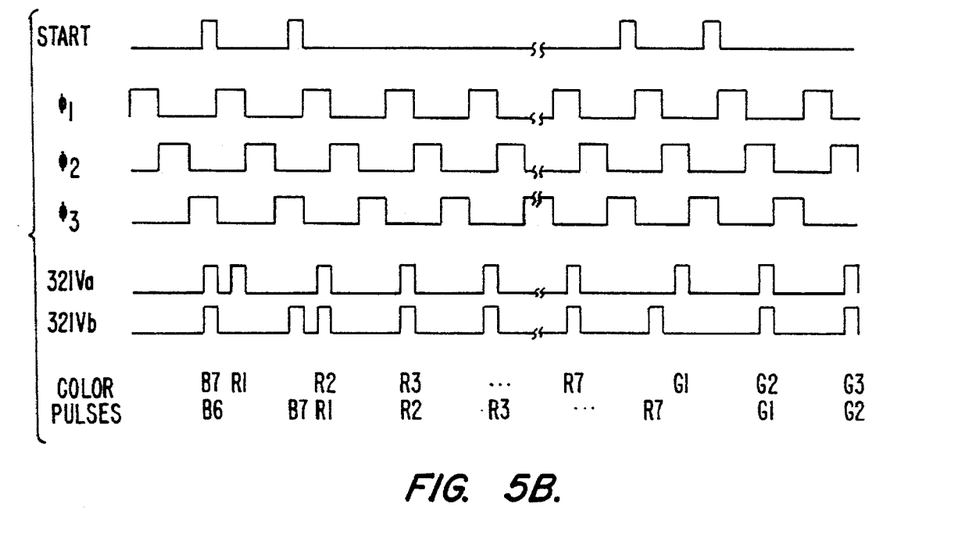
FIG. 5B is a timing diagram illustrating the operation of the light source of FIG. 5A.

FIGS. 5A, 5B illustrate an alternative electrode connection scheme for the same chamber construction shown in FIG. 3. In this scheme, the connection of anode 321 is separated into two groups, each one having its own current limiting device CLD. The waveform for START is also changed slightly to allow two of the portions 312 to be discharging at one time. By separating anode 321 and providing separate current limiting devices, two main portions 313 can be ignited at the same time. This will allow the light output to be doubled by the device with minimum increase in the cost of driving electronics. It should be noted that, by splitting anode connections into more groups and some minor changes in the multi-phased driving scheme, the illustrated scheme can be extended into cases where more than two portions 313 are to be ignited at one time. The extension is straightforward and is within the scope of this invention.

Figure 6B:
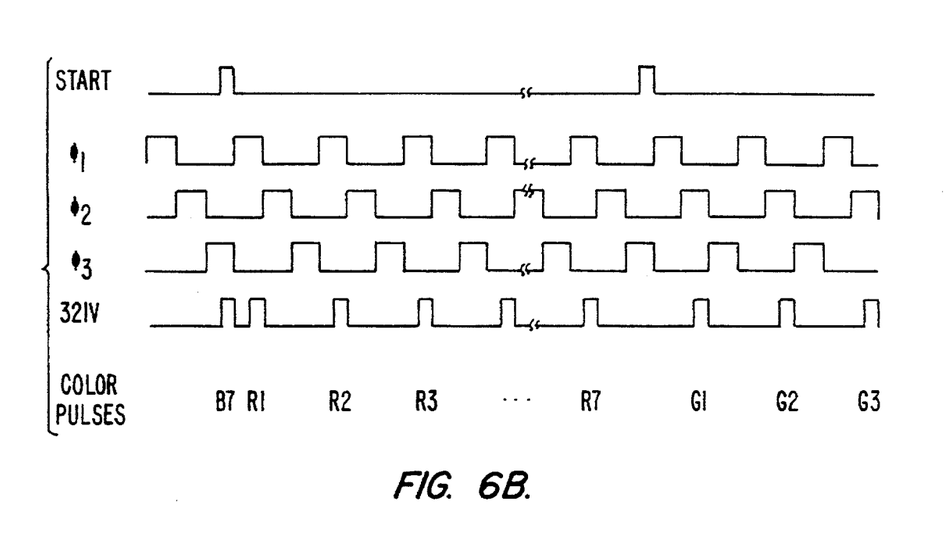
FIG. 6B is a timing diagram illustrating the operation of the light source of FIG. 6A.

FIGS. 6A, 6B show another alternative electrode connection scheme for the same chamber configuration as shown in FIG. 3. In this alternative, the anode is replaced by a pair of parallel electrodes, 321A and 321B, located in the center of the primary discharge tunnels 313, and the cathode 322 is replaced by electrodes 322A and 322B located at two ends of the channels. The driving signal waveforms are identical to those shown in FIG. 4 except for the value of the voltages. As discussed earlier, the advantage of this arrangement is to allow the discharge path to be reduced for cases where the recombination of plasma particles along the surface of portions 313 has caused the driving voltage to be raised significantly. Two anodes and two current-limited devices are needed since now there are two discharge paths in each of the primary discharge portions 313. The scheme can be readily extended into cases where each portion 313 has more than two discharge paths by adding more electrodes. However, the scheme shown in FIG. 6 has the advantage that the anodes at the center of 313 will have minimum effect on the light generated by portions 313. On the other hand, the cathodes will produce significant visible light in the negative glow (avalanching) region (neon red for Ne gas) which may degrade the color purity if they were to be placed in the center of portions 313.

Figure 7:
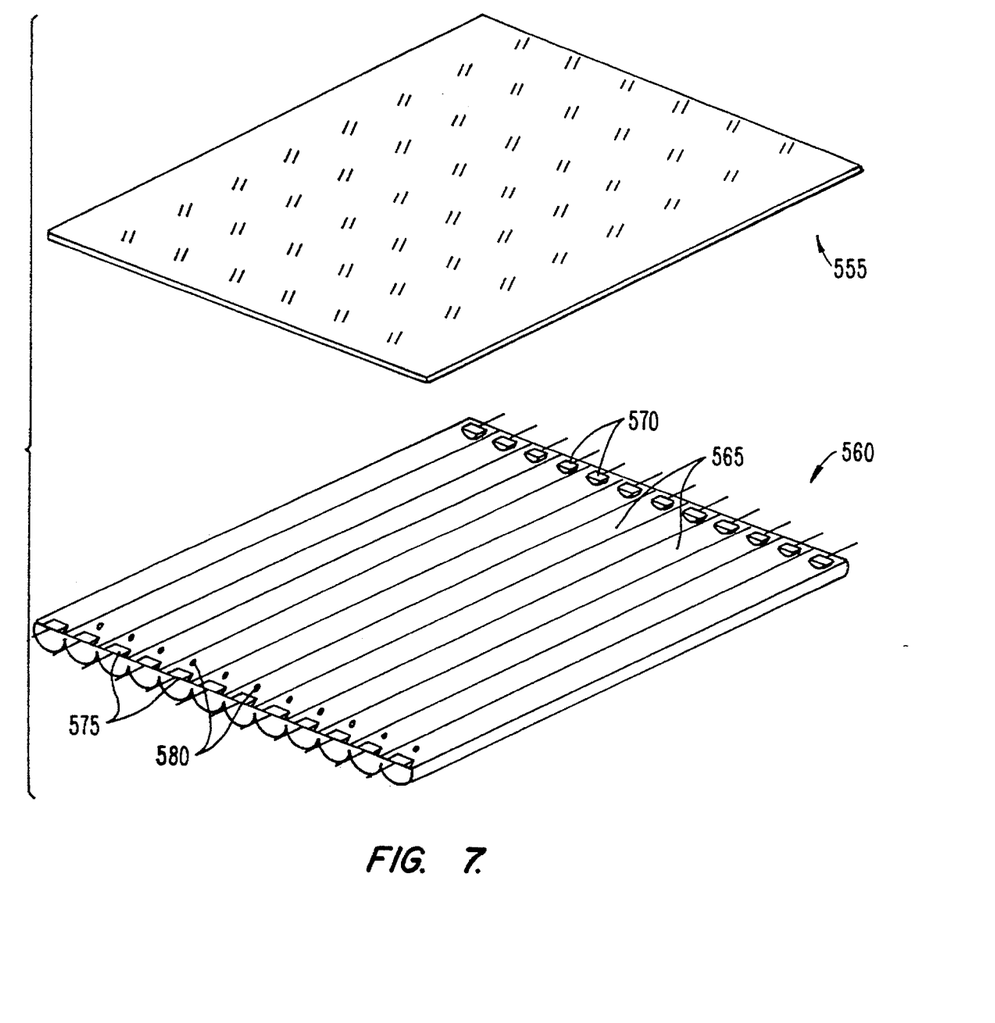
FIG. 7 is an exploded view of a light source illustrating a fifth embodiment of the backlight unit of FIGS. 1A, 1B.

Referring to FIG. 7, an alternative embodiment of the backlight unit 32 is illustrated. The illustrated embodiment contains a face plate 555 and a formed plate 560. Plate 555 is made of substantially transparent material such as glass. The formed plate 560 contains multiple parallel grooves 565. These grooves will form discharge channels when plate 555 is placed attached to the formed plate 560. Plate 560 can be made of formed glass/ceramic or photo etched glass such as Fotoform glass of Corning. Phosphor material and other proper reflective and absorption material are coated on the surface of these grooves. The cross-sectional of these grooves are substantially parabolic such that the light produced by the phosphor coating are effectively projected forward. Holes 580 are formed along the walls of the formed plate 560. These holes connect the discharge tunnels formed by groove 565 to allow charged particles to be propagated between adjacent discharge tunnels. These charged particles will provide the necessary priming to allow each of the discharge tunnels to be ignited promptly.

Electrodes 575 and 570 are made of material such as nickel or aluminum. Preferably, these electrodes are made of hollow tubes such that the internal surface of the tube is used as the cathode. The tube shape of these electrodes helps to both increase the effective cathode surface area and to reduce the phosphor coating contamination caused by cathode sputtering. The discharge of the tunnel is achieved by applying suitable ignition voltage to electrodes 575 and 570. By providing pilot cells and start electrodes similar to the previous embodiment as illustrated in FIG. 3 (not shown in FIG. 7), the device can be scanned by the same multi-phase self-scan control scheme illustrated in FIGS. 4A, 4B, 5A, 5B, 6A and 6B.

Although the current embodiment is also applicable to a self scan control scheme such as the pilot discharge array control scheme illustrated in FIG. 4B, this structure is particularly suitable also for generating white light pulses for LCD with the conventional color filter. The advantage of this structure over the conventional backlight structure is that, as demonstrated by the control scheme in FIGS. 6A, 6B the number of discharge tunnels to be activated at one time is controllable. This allows a much wider range of control for the screen brightness. In addition, since the lighting elements are flat and are placed directly under the LCD screen, the total thickness of the display can be significantly reduced. Finally, since it does not require a light coupling device such as the conventional light pipe or light box, the percentage of backlight pulses that can pass through the LCD screen will be much higher.

Figure 8A:
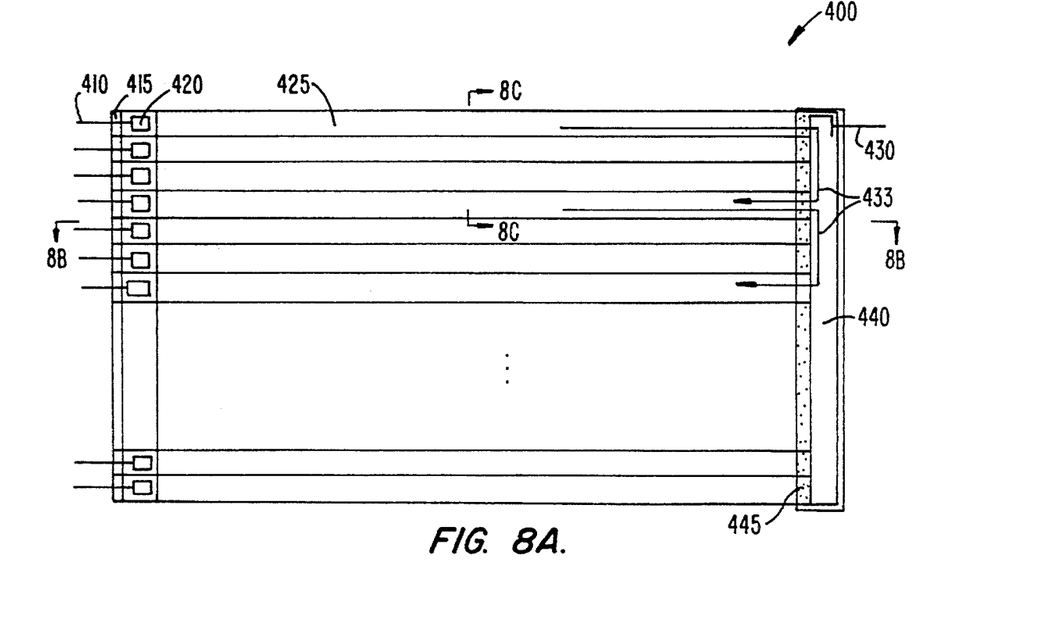
FIG. 8A is a top view of a light source illustrating a sixth embodiment of the backlight unit of FIGS. 1A, 1B.
Figure 8B:
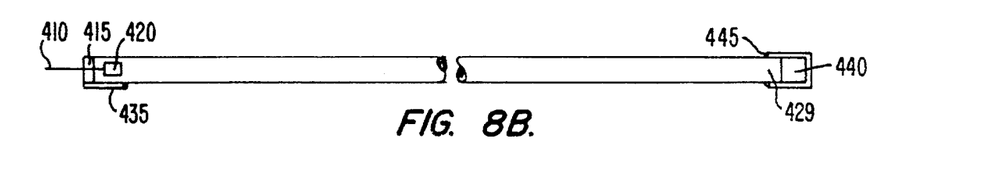
FIG. 8B is a cross-sectional view of a portion of the light source of FIG. 8A along the line 8B—8B in FIG. 8A.
Figure 8C:
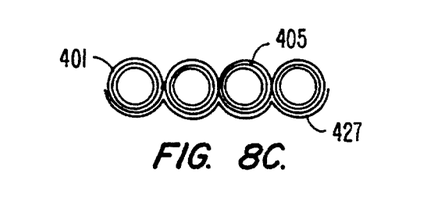
FIG. 8C is a cross-sectional view of a portion of the light source of FIG. 8A along the line 8C—8C in FIG. 8A.

Referring to FIG. 8A, a third alternative embodiment of the backlight unit 32 is illustrated. This embodiment uses separate glass tube 425 as the discharge tunnel. The tubes are sealed in one end by end piece 415. These tubes are connected by a common tunnel 440 on the other end. Inside tubes 425, phosphor material 405 is coated on the wall. The phosphor coating 425 will convert the UV light generated by gas discharged into visible light of one or more colors. As shown in FIG. 8C, on one side of tubes 425, reflective coating 427 may be added to reflect the back projecting lights forward to the LCD screen. Coating 427 can be made of material such as aluminum. Discharge electrodes 420 and 410 are placed at the closed end of the glass tubes 425. Electrodes 420 can be made of nickel tubes. Electrode 430 is added to perform as a pilot RESET electrode.

The discharge is formed by applying ignition voltage to two of the electrodes 420 at a time. The discharge will form a U-shaped path 433 by occupying two of the discharge tunnels 425 containing the energized electrodes 420 and the section of tunnel 440 linking the two discharge tunnels. Preferably, between subsequent discharges, there should always be one arm of the U-shaped discharge path overlapping with each other. By overlapping discharge paths, it will be easy to ignite the discharge since there are a large number of charged particles available for priming. After scanning through tunnels 425 from the top tunnel to the bottom tunnel by properly applying signals to electrodes 420, the discharge is cycled back by first forming a discharge between the last electrode 420 (at or near the bottom of the back end unit) and the electrode 430 and then forming a discharge between electrode 430 and first electrode 420 (at or near the top of the back end unit). In comparison to the method of operation of the embodiments of FIGS. 3–7, the gas discharges throughout the lengths of the tunnels or channels in device 400 of FIGS. 8A–8C also generate the necessary priming charged particles for the next ignition, so that no separate charged particle generating or populating step is necessary for the next ignition.

Although this embodiment has been illustrated using glass tubes, it should be noted that the basic structure can also be obtained in other forms such as stacking a formed plate and a flat glass plate together as in the two previous embodiments. Such variations are considered as within the scope of this invention.

What is claimed is:

1. A display apparatus comprising:
   (a) a front end unit including:
      a body having rows of areas that are light modulating defining arrays of pixels for light transmission;
      a front end control device controlling intensity of light transmission through the pixels for displaying images; and
   (b) a back end unit including:
      a housing having at least one array of gas discharge channels substantially parallel to the arrays of pixels, wherein gas discharge in said channels causes said channel to emit light;
      priming means populating at least some of the channels with charged particles before gas discharge occurs in said at least some of the channels;
      a back end control device controlling gas discharge in said channels so that gas discharge occurs in each of said at least some channels after it is populated therein with charged particles, said back end control device controlling gas discharge in said channels so that selected channels of said at least some channels emit light sequentially to supply light to the front end unit for displaying images.

2. The apparatus of claim 1, said priming means including one or more passages in said housing in communication with said at least some of the channels so that charged particles resulting from gas discharge in one or more of said at least some channels facilitates subsequent gas discharges in one or more different ones of said at least some of the channels.

3. The apparatus of claim 2, wherein each of the channels have first and second ends, said one or more passages connecting the first ends of some of the channels to permit the propagation of charged particles between different channels through said passages.

4. The apparatus of claim 3, said back end unit further including discharge electrodes at or near the second ends.

5. The apparatus of claim 3, said priming means further including a pilot reset electrode in the one or more passages at or near the first end of a channel for initiating gas discharge for one or more scanning cycles.

6. The apparatus of claim 3, said back end control device causing gas discharge in a pair of two channels simultaneously and at least a portion of the one or more passages connecting the two channels, said device causing gas discharge sequentially in different pairs of channels in a plurality of consecutive time intervals, said back end control device being such that during at least two consecutive time intervals, the two pairs of channels in which gas discharge occurs during such intervals overlap by at least one channel, so that charged particles generated during the earlier of the two consecutive time intervals facilitate gas discharge during the later of the two consecutive time intervals.

7. The apparatus of claim 2, said housing comprising channel walls separating adjacent channels, said priming means including an array of passages each connecting two adjacent channels to permit the propagation of charged particles between adjacent channels.

8. The apparatus of claim 7, said array of passages aligned substantially along a line transverse to the array of channels to permit the propagation of charged particles sequentially through the aligned array of passages from one channel to the next in the array of channels to facilitate sequential gas discharge in the array of channels.

9. The apparatus of claim 8, said channels having ends, said array of passages located near the ends of the channels.

10. The apparatus of claim 8, said array of passages being aligned substantially along a zigzag line that is substantially perpendicular to the channels.

11. The apparatus of claim 8, said back end unit further comprising discharge electrodes in each channel for controlling gas discharge in the channels.

12. The apparatus of claim 11, said priming means further including one or more pilot discharge electrodes in each channel and located in the vicinity of the passage or passages connecting such channel to adjacent channel or channels for controlling pilot gas discharge in such channel to generate discharge particles that facilitate gas discharge in such channel as controlled by the discharge electrodes.

13. The apparatus of claim 12, wherein an electrode in at least one channel serves as a pilot discharge electrode as well as a discharge electrode, thereby reducing the number of electrodes in such at least one channel.

14. The apparatus of claim 12, wherein said back end control device and/or the priming means applies control signals to the pilot discharge electrodes in each channel to cause gas discharge therein, said signals applied to the pilot discharge electrodes in channel by channel sequentially in the array of channels to cause gas discharges across the pilot discharge electrodes in channel by channel sequentially in the array of channels.

15. The apparatus of claim 14, wherein said back end control device applies an electrical potential across the discharge electrodes of a selected channel to cause gas discharges across a main portion of the selected channel after gas discharge has started across the pilot discharge electrodes in such channel to provide charged particles for facilitating gas discharge in the main portion.

16. The apparatus of claim 14, wherein the array of pilot discharge electrodes are connected electrically into multiple groups, said back end control device and/or the priming means applying said control signals in multiple phase self scanning mode.

17. The apparatus of claim 1, said body being a layer of light modulating material, said front end control device including an array of row electrodes and an array of column electrodes transverse to the array of row electrodes, said row electrodes overlapping column electrodes over said layer when viewed in a viewing direction to define consecutive rows of pixels at the layer, so that light transmittance through the pixels is controlled by electrical signals applied to the row and column electrodes.

18. The apparatus of claim 17, said front end control device applying two or more sequences of electrical signals to the row and column electrodes to cause the light transmittance through the pixels to sequentially change one row at a time, defining a scanning process sequentially scanning the rows of pixels during which one row of pixels is scanned at a time, each sequence corresponding to one of a plurality of colors, wherein each sequence of electrical signals controls the light transmittance of the rows of pixels for passage of light of the corresponding color.

19. The apparatus of claim 18, said at least one array of gas discharge channels being substantially parallel to the row electrodes, each channel overlapping at least one corresponding row of pixels in the front end unit when viewed in the viewing direction, said channels emitting light of one of said plurality of colors when gas discharge occurs in said channels;

said back end control device controlling gas discharge in said channels so that each of said at least some channels emits light of one of said plurality of colors at a predetermined delay after the application of electrical signals in the sequence corresponding to such color to change the light transmittance of the at least one row of pixels corresponding to such channel for passage of light.

20. The apparatus of claim 1, wherein each of at least some of said channels includes a main portion and a pilot portion, and photo-luminescent material coating at the main portion, but no photo-luminescent material coating at the pilot portion, to reduce light emission from the pilot portions.

21. The apparatus of claim 1, wherein the back end unit further comprises cold cathodes in the channels for causing gas discharge in the channels.

22. The apparatus of claim 1, said back end unit further comprising reflectors at the channels to project light towards the front end unit.

23. The apparatus of claim 1, wherein the priming means includes a keep alive cell to continuously generate charged particles.

24. The apparatus of claim 1, the housing of said back end unit including an array of spacers, arranged with one or more spacers separating any two adjacent channels to isolate the gas discharges in any two adjacent channels from each other.

25. The apparatus of claim 24, said spacers comprising an array of tubes each defining a channel therein.

26. The apparatus of claim 24, said housing comprising a face plate and a back plate with ribs facing and attached to the front plate to define channels, wherein the ribs are the spacers.

27. The apparatus of claim 26, said housing further comprising one or more coating on the back plate to reflect both visible light and ultraviolet light.

28. The apparatus of claim 26, said housing further comprising a layer between the front and back plates, said layer reflecting ultraviolet light and transmitting visible light.

29. The apparatus of claim 26, said back end unit further including discharge electrodes on the face plate.

30. The apparatus of claim 1, said back end unit further including two or more discharge electrodes in each channel, each of said channels having two ends, wherein at least one of the discharge electrodes is located between the ends of a channel to divide such channel into shorter channels with a shorter gas discharge path.

31. The apparatus of claim 30, each of said channels having two ends, said back end unit further including four discharge electrodes in each channel, two discharge cathodes at or close to the ends of each channel, and two discharge anodes between the two ends of each channel.

32. A display method employing a device comprising a front end unit including a body having arrays of areas that are light modulating defining arrays of pixels for light transmission and a back end unit including a housing having at least one array of gas discharge channels substantially parallel to the arrays of pixels, wherein gas discharge in said channels causes said channel to emit light; said method comprising:

modulating the intensity of light transmission through the pixels for displaying images; and populating at least some of the channels with charged particles before gas discharge occurs in main portions of said at least some of the channels and causing gas discharge in main portions of said channels so that gas discharge occurs in main portion of each of said at least some channels after it is populated therein with charged particles, and so that selected channels of said at least some channels emit light sequentially to supply light to the front end unit for displaying images.

33. The method of claim 32, said body being a layer of light modulating material, said front end unit including an array of row electrodes and an array of column electrodes transverse to the array of row electrodes, said row electrodes overlapping column electrodes over said layer of light modulating material when viewed in a viewing direction to define consecutive rows of pixels at the layer;

wherein said modulating step applies two or more sequences of electrical signals to the row and column electrodes, each sequence causing the light transmittance through the pixels to sequentially change one row at a time, defining a scanning process sequentially scanning the rows of pixels during which one row of pixels is scanned at a time, each sequence corresponding to one of a plurality of colors, wherein each sequence of electrical signals controls the light transmittance of the rows of pixels for passage of light of the corresponding color.

34. The method of claim 33, wherein said at least one array of gas discharge channels is substantially parallel to the row electrodes, each channel overlapping at least one corresponding row of pixels in the front end unit when viewed in the viewing direction, said channels emitting light of one of said plurality of colors when gas discharge occurs in said channels;

wherein said populating and causing step causes each of said at least some channels to emit light of one of said plurality of colors at a predetermined delay after the application of electrical signals in the sequence corresponding to such color to change the light transmittance of the at least one row of pixels corresponding to such channel for passage of light.

35. The method of claim 32, said populating and causing step populating the at least some of the channels consecutively with charged particles by populating each of said some of the channels, followed by populating a channel adjacent to such channel before gas discharge occurs in main portions of such channels.

36. The method of claim 35, said populating and causing step including causing a pilot gas discharge in a pilot portion of each of said some of the channel so that the pilot gas discharges occur channel by channel consecutively in the at least some of the channels.

37. The method of claim 35, said populating and causing step causes gas discharges in main portions of selected channels, wherein the gas discharge occurring in the main portion of a selected channel occurs after a pilot gas discharge in such channel has populated such channel with charged particles but before such particles are dissipated.

38. The method of claim 32, said populating and causing step causes gas discharge sequentially in different pairs of channels in a plurality of consecutive time intervals, said populating and causing step being such that during at least two consecutive time intervals, the two pairs of channels in which gas discharge occurs during such intervals overlap by at least one channel, so that charged particles generated during the earlier of the two consecutive time intervals facilitate gas discharge during the later of the two consecutive time intervals.

39. A display device comprising:

a front end unit having an array of row electrodes and an array of column electrodes transverse to the array of row electrodes, said row electrodes overlapping column electrodes over a layer of light modulating material when viewed in a viewing direction to define consecutive rows of pixels at the layer, so that light transmittance through the pixels is controlled by electrical signals applied to the row and column electrodes;

a front end control unit applying two or more sequences of electrical signals to the row and column electrodes to cause the light transmittance through the pixels to sequentially change one row at a time, defining a scanning process sequentially scanning the rows of pixels during which one row of pixels is scanned at a time, each sequence corresponding to one of a plurality of colors, wherein each sequence of electrical signals controls the light transmittance of the rows of pixels for passage of light of the corresponding color; and a back end unit having at least one array of gas discharge channels substantially parallel to the row electrodes, each channel overlapping at least one corresponding row of pixels in the front end unit when viewed in the viewing direction, said channels emitting light of one of said plurality of colors when gas discharge occurs in said channels;

priming means in the back end unit populating at least some of the channels with charged particles before gas discharge occurs in said at least some of the channels;

a back end control unit controlling gas discharge in said channels so that gas discharge occurs in each of said at least some channels after it is populated therein with charged particles, said back end control unit controlling gas discharge in said channels so that each of said at least some channels emits light of one of said plurality of colors at a predetermined delay after the application of electrical signals in the sequence corresponding to such color to change the light transmittance of the at least one row of pixels corresponding to such channel for passage of light.

40. A display method employing a device comprising:

a front end unit including an array of row electrodes and an array of column electrodes transverse to the array of row electrodes, said row electrodes overlapping column electrodes over a layer of light modulating material when viewed in a viewing direction to define consecutive rows of pixels at the layer, so that light transmittance through the pixels is controlled by electrical signals applied to the row and column electrodes;

a back end unit having at least one array of gas discharge channels substantially parallel to the row electrodes, each channel overlapping at least one corresponding row of pixels in the front end unit when viewed in the viewing direction, said channels emitting light of one of said plurality of colors when gas discharge occurs in said channels;

said method comprising:

applying two or more sequences of electrical signals to the row and column electrodes, each sequence causing the light transmittance through the pixels to sequentially change one row at a time, defining a scanning process sequentially scanning the rows of pixels during which one row of pixels is scanned at a time, each sequence corresponding to one of a plurality of colors, wherein each sequence of electrical signals controls the light transmittance of the rows of pixels for passage of light of the corresponding color;

populating each of at least some of the channels with charged particles;

causing gas discharge in said channels so that gas discharge occurs in each of said at least some channels after it is populated therein with charged particles, said gas discharge causing step also causes each of said at least some channels to emit light of one of said plurality of colors at a predetermined delay after the application of electrical signals in the sequence corresponding to such color to change the light transmittance of the at least one row of pixels corresponding to such channel for passage of light.

\* \* \* \* \*